United States Patent
Revilla et al.

[11] Patent Number: 5,862,353
[45] Date of Patent: Jan. 19, 1999

[54] SYSTEMS AND METHODS FOR DYNAMICALLY CONTROLLING A BUS

[75] Inventors: Juan Guillermo Revilla, Cary; Thomas Andrew Sartorius, Raleigh; Mark Michael Schaffer, Cary, all of N.C.

[73] Assignee: International Business Machines Corporation, Armonk, N.Y.

[21] Appl. No.: 823,736

[22] Filed: Mar. 25, 1997

[51] Int. Cl.[6] .................................................. G06F 13/36
[52] U.S. Cl. .......................... 395/287; 395/303; 395/728; 395/729; 395/293
[58] Field of Search .................................. 395/303, 287, 395/728, 293, 729

[56] References Cited

U.S. PATENT DOCUMENTS

| | | | |
|---|---|---|---|
| 3,886,524 | 5/1975 | Appelt | 340/172.5 |
| 4,151,592 | 4/1979 | Suzuki et al. | 364/200 |
| 4,275,440 | 6/1981 | Adams, Jr. et al. | 364/200 |
| 4,302,808 | 11/1981 | Zanchi et al. | 364/200 |
| 4,375,639 | 3/1983 | Johnson, Jr. | 340/825.5 |
| 4,535,330 | 8/1985 | Carey et al. | 340/825.5 |
| 4,602,327 | 7/1986 | LaViolette et al. | 395/287 |
| 4,987,529 | 1/1991 | Craft et al. | 364/200 |
| 5,034,881 | 7/1991 | Hoashi et al. | 395/303 |
| 5,140,680 | 8/1992 | Best | 395/325 |
| 5,195,185 | 3/1993 | Marenin | 395/303 |
| 5,301,283 | 4/1994 | Thacker et al. | 395/325 |
| 5,388,228 | 2/1995 | Heath et al. | 395/325 |
| 5,438,666 | 8/1995 | Craft et al. | 395/842 |
| 5,440,698 | 8/1995 | Sindhu et al. | 395/200.08 |
| 5,467,454 | 11/1995 | Sato et al. | 395/296 |
| 5,506,972 | 4/1996 | Heath et al. | 395/293 |
| 5,530,838 | 6/1996 | Hisano | 711/151 |
| 5,546,548 | 8/1996 | Chen et al. | 395/296 |
| 5,623,672 | 4/1997 | Popat | 395/728 |

*Primary Examiner*—Gopal C. Ray
*Attorney, Agent, or Firm*—Steven B. Phillips; Timothy J. O'Sullivan

[57] ABSTRACT

Bus performance in a computer system having multiple devices accessing a common shared bus may be improved by increasing throughput and decreasing latency while accounting for dynamic changes in bus usage. Devices submit a priority level along with a bus request to a bus controller. Upon receiving multiple requests, an arbiter of the bus controller compares the priority levels associated with the different bus requests and grants control of the bus to the device having the highest priority level. During each cycle that a device has control of the bus, a feedback logic circuit of the bus controller determines whether other bus requests are pending, and if so, determines the highest pending request priority level. Signals corresponding to the results of these determinations are fed back to each device. The device having control of the bus uses the combination of the currently pending request priority level and the device's own latency timer to determine whether it should maintain control of the bus or relinquish control of the bus.

50 Claims, 5 Drawing Sheets

FIG. 5

| CYCLE | 1 | 2 | 3 | 4 | 5 | 6 | 7 | 8 | 9 | 10 | 11 | 12 |
|---|---|---|---|---|---|---|---|---|---|---|---|---|
| CLOCK | | | | | | | | | | | | |
| BUS | | | | | | | | | | | | |
| M1 REQUEST | 1 | | | | | | | | | | | |
| M1 PRIORITY | 10 | | | | | | | | | | | |
| M1 GRANT | | 1 | | | | | | | | | | |
| M1 LATENCY | | RESET | | EXPIRED | EXPIRED | EXPIRED | EXPIRED | | | | | |
| M1 BURST | | | | | | | | | | | | |
| M2 REQUEST | | | 1 | 1 | 1 | 1 | 1 | 1 | 1 | 1 | | |
| M2 PRIORITY | | | 10 | 10 | 10 | 10 | 10 | 10 | 10 | 10 | | |
| M2 GRANT | | | | | | | | | | | | |
| M2 LATENCY | | | | | | | 1 | 1 | 1 | 1 | 1 | |
| M2 BURST | | | | | | | | | | | | |
| M3 REQUEST | | | | 1 | 1 | 1 | 1 | | | | | |
| M3 PRIORITY | | | | 01 | 01 | 01 | 11 | | | | | |
| M3 GRANT | | | | | | | | | | | 1 | |
| M3 LATENCY | | | | | | | | RESET | | | | |
| M3 BURST | | | | | | | | | | | | |
| REQUEST PENDING | 1 | 0 | 1 | 1 | 1 | 1 | 1 | 1 | 1 | 1 | 0 | 0 |
| PENDING REQUEST PRIORITY | 10 | 0 | 10 | 10 | 10 | 10 | 11 | 10 | 10 | 10 | 0 | 0 |

SYSTEMS AND METHODS FOR DYNAMICALLY CONTROLLING A BUS

FIELD OF THE INVENTION

The present invention relates to system bus performance, and more particularly, to dynamically controlling a bus to improve throughput and decrease latency.

BACKGROUND OF THE INVENTION

The number of functions on a single integrated circuit chip continues to increase in concert with an increase in chip densities. These "system-on-a-chip" integrated circuits typically use a common, shared bus architecture to provide the communication link between the various devices and subsystems of the "computer system." A common bus provides a low cost communication link since it can be shared between multiple devices in the computer system. However, the linking of multiple devices to a single bus may raise concerns over maximum bus performance.

Achieving maximum bus performance may be difficult in a shared bus architecture. Factors which severely impact bus performance include system throughput (i.e., bandwidth) and system response time (i.e., latency). For purposes of determining throughput or bandwidth, a bus transaction is a bus transaction completed by the device which is on the receiving end of the transmission. Throughput or bandwidth is the average number of bus transactions over a period of time. Response time or latency is the time it takes to complete a bus transaction for a particular device beginning with the cycle during which the device first requests the bus until the cycle that the last piece of data is transferred from the device across the bus to a second device. A device which requests access to or control of a bus and transmits and receives data across a bus may be referred to as a "master." A device which transmits or receives data across a bus and is responsive to a master, may be referred to as a "slave." A slave cannot request access to or control of a bus.

In order to achieve a high degree of bus performance, the throughput must be high while the latency must be low. Further, in order to achieve a high level of bus throughput, the slave preferably is never idle and, consequently, the bus is preferably never idle. In contrast, however, since latency refers to the time it takes to complete a bus transaction beginning with the cycle during which a master first requests the bus until the cycle during which the last data is transferred by the master across the bus, latency includes the time during which a master waits for the bus to become available (i.e., idle). As a result, latency is reduced by allowing the bus to be idle.

A number of different architectural designs have been developed in an effort to address bus performance, including throughput and response time. Many of these schemes rely on the "priority" level of the device seeking control of the bus. For example, U.S. Pat. No. 5,438,666 to Craft et al. describes an arbitration system for controlling access to a bus. The arbitration system of Craft et al. interrupts the control of the bus by a first device when a second device having greater priority requests access to the bus. Once the second device completes its access to the bus, control of the bus is returned to the first device. The transfer of control is implemented without requiring the timing overhead of arbitrating priority between bus masters having active bus requests.

U.S. Pat. No. 5,140,680 to Best describes a bus arbitration system for a computer network having multiple master and slave devices which share a common bus. The bus arbitration system includes bus arbitration logic in each master device, and accounts for the slowest master's operational delay when determining which master shall have access to the bus at a given time.

By way of further example, U.S. Pat. No. 5,388,228 to Heath et al. which is assigned to International Business Machines Corporation, the assignee of the present invention, describes an arbitration system having a central arbitration control circuit and a local arbiter associated with each device seeking access to a common bus. Heath et al. also provides for the programming of each device to operate in either a linear mode or a fairness mode. When operating in the fairness mode, a first device having access to the bus in response to a second device requesting bus access will relinquish control of the bus, once the first device has completed an appropriate number of transfers, allowing the requesting device having the next highest priority level to gain control of the bus.

Other designs which involve sharing of a common bus have attempted to address the conflicting design requirements of high throughput and low latency by using long burst transfers to achieve higher throughputs while using master latency timers to reduce latency by limiting the length of the bursts. Latency timers typically may be implemented in a master using a programmable register and a counter. The initial latency count value which represents the maximum number of clock cycles that the master may maintain control or ownership over the common bus is loaded into the programmable register. The counter is typically reset to zero each time the device gains control of the bus. Once the value of the counter reaches the value stored in the register (i.e., the latency timer has expired), the corresponding device having control over the bus must relinquish the control regardless of the system's bus usage conditions.

As a result, in systems where the bus usage is light (i.e., data transfer across the bus is relatively minimal), a device whose latency timer has expired, and consequently, must relinquish control of the bus even though it has additional data to transfer across the bus, has a bandwidth (i.e., throughput) which may be unnecessarily limited. Moreover, in systems where bus usage is relatively high, in that various devices are requesting the bus simultaneously, a device is likely to use the bus until its latency timer expires. One device's control of the bus until its latency timer expires causes other devices to wait for the bus to become available, and consequently, experience relatively high latencies.

Moreover, the bus usage conditions in a system may vary over time from, for example, light usage to heavy usage back to light usage. Consequently, it may be necessary to update each device's latency timer in order to achieve maximum bus performance. A latency time may be updated by reprogramming the register and counter. However, significant overhead is required to reprogram each device's latency timer, particularly if it occurs on a regular basis. Thus, use of latency timers to improve bus performance is generally ineffective due to dynamically changing bus usage conditions.

Although various arbitration schemes or latency timers are presently used to control access to a common bus in multiple device systems, these prior designs may not effectively address the conflicting design requirements of high throughput and low latency. Moreover, these prior designs do not account for dynamically changing bus usage conditions. In order to improve maximum bus performance, the conflicting problems of high throughput and low latency must be addressed while accounting for dynamically changing bus usage conditions.

SUMMARY OF THE INVENTION

It is, therefore, an object of the present invention to provide systems, methods and computer program products for improving bus performance in a computer system in which multiple devices share a common bus.

It is another object of the present invention to provide systems, methods and computer program products for increasing throughput and decreasing latency in a computer system having multiple devices sharing a common bus.

It is still a further object of the present invention to provide systems, methods and computer program products for improving bus performance in a computer system having multiple devices sharing a common bus by accommodating dynamically changing bus usage conditions.

These and other objects are provided according to the present invention by a system for improving bus performance in a computer system having multiple devices accessing a common bus by increasing throughput while decreasing latency in a computer system.

The system according to the present invention dynamically controls the access of multiple devices to a common bus by combining the effect of priority levels and latency, and by dynamically controlling the latency timer of a device. Each master in the system has an associated latency timer and a priority level indicator. The latency timer may be implemented using a register representing the maximum number of cycles that the device may control the bus and a counter for counting the cycles of control. The priority level indicator represents the priority level associated with the device.

In a preferred embodiment, the system dynamically controls the bus by using a bus controller which is operationally connected to each of the devices. The bus controller controls the duration that a first device has control over the bus based on the combination of the latency timer associated with the first device, the priority level associated with the first device and the priority level associated with a pending request received by the bus controller from a second device. In addition, the system prevents all other devices from controlling the bus while one device has control of the bus.

The bus controller comprises a means for granting a request from a first device to control the bus. The bus controller also includes means for receiving a request to control the bus and an associated priority level from a second device, and feedback means for transmitting the priority level associated with the request received from the second device to the first device in response to the receipt of the request from the second device. Finally, the bus controller also includes means for controlling the duration of the control of the bus by the first device based on a combination of the latency timer associated with the first device and the results of a comparison of the priority level of the first device with the priority level associated with the request from the second device.

Still further, the bus controller may also comprise a means for continuing control of the bus by the first device if the latency timer of the first device has not expired, even if the priority level of the second device is greater than the priority level of the first device. An extension means is also provided for extending the duration of control of the bus by the first device if the priority level associated with the first device is greater than or equal to the priority level associated with the second device, even if the latency timer associated with the first device has expired. The system will terminate or relinquish control of the bus by the first device if the priority level associated with the first device is less than the priority level associated with the second device and the latency timer associated with the first device has expired.

In a first alternative embodiment, the present invention provides a system for dynamically controlling access to a bus having devices that are operationally connectable to the bus. Each of the devices has a priority level associated with it. In this alternative embodiment, a first device has control of the bus. The system receives a request to control the bus and an associated priority level from a second device, and compares the priority level associated with each device other than the first device from which a control request is received to identify the priority level having the greatest value. The identified priority level having the greatest value and a corresponding pending request signal are fed back to the first device.

In a second alternative embodiment, the present invention provides a system for dynamically accessing a bus. The system comprises a plurality of devices, each of which may be operationally connected to the bus. Each device also has a priority level associated with it. The system controls the duration of access to the bus by the first device based on the combination of the latency timer and the priority level associated with the first device, and a priority level associated with a pending request by a second device to control the bus. In addition, the first device receives control of the bus from a bus controller in response to its request to control the device and the priority level associated with it. The first device also receives a second priority level from the bus controller which is associated with a pending control request received by the bus controller from a second device.

In the second alternative embodiment, the first device continues to control the bus if its latency timer has not expired, even if its priority level is less than the second priority level associated with the request from a second device. The first device extends the duration of its control of the bus in response to its associated priority level being greater than or equal to the priority level associated with a second device, even if the latency timer associated with the first device has expired. Finally, the first device relinquishes or terminates its control of the bus if its associated priority level is less than the priority level associated with the second device and the latency timer associated with the first device has expired.

As a result, the present invention combines the use of priority and latency to improve bus performance. The latency timer of the device having control of the bus may be dynamically changed. This is accomplished by the present invention by overriding an expired latency timer by allowing the corresponding device to continue control of the bus as long as its priority is at least as great as the pending request priority indicator. Once the pending request priority indicator is greater than the priority level of the device presently controlling the bus, the device presently controlling the bus will relinquish or terminate control of the bus.

BRIEF DESCRIPTION OF THE DRAWINGS

FIG. 5 is a timing diagram illustrating exemplary operations of the dynamic controlling system according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

As will be appreciated by one of skill in the art, the present invention may be embodied as a method, a system, or a computer program product. Accordingly, the present invention may take the form of an entirely hardware embodiment, an entirely software embodiment, or an embodiment combining software and hardware aspects.

Figure 1:
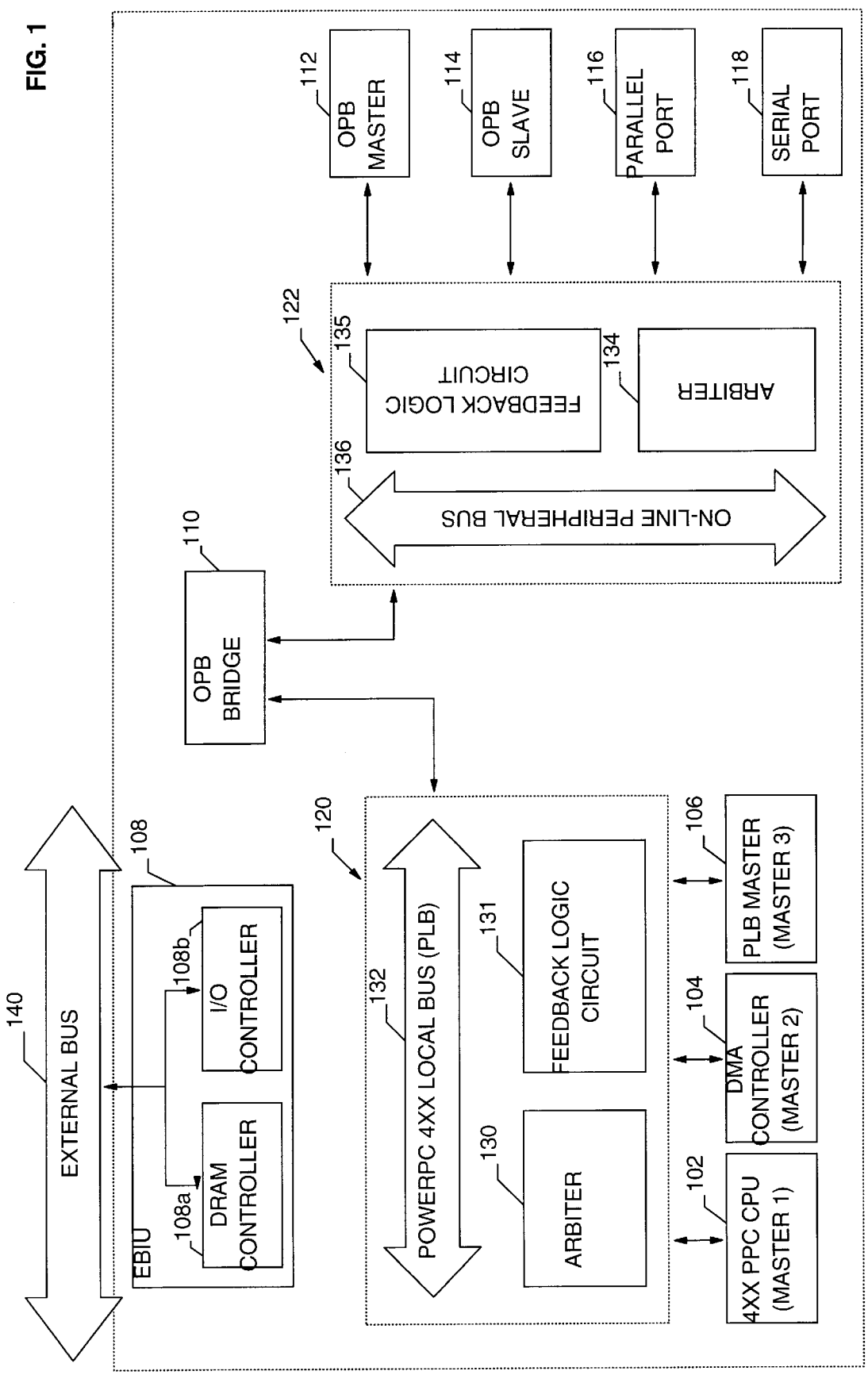
FIG. 1 is a block diagram illustrating a computer system according to the present invention.

Referring to FIG. 1, a block diagram illustrating a computer system according to the present invention is shown. In the example of the computer system illustrated generally at 100, computer system 100 is preferably on a single integrated circuit chip. Computer system 100 has a number of devices and a bus. In particular, computer system 100 has several master devices including a 4XX PowerPC ("PPC") central processing unit ("CPU") 102, a direct memory access ("DMA") controller 104 and a PowerPC local bus ("PLB") master 106. In addition, computer system 100 also has an external bus interface unit ("EBIU") 108, which includes a dynamic random access memory ("DRAM") controller 108a and an input/output ("I/O") controller 108b. Still further, computer system 100 also has an on-chip peripheral bus ("OPB") bridge 110, an OPB master 112, an OPB slave 114, a parallel port 116 and a serial port 118.

Finally, the computer system 100 also has two bus controllers, a bus controller referred to generally at 120 and a bus controller referred to generally at 122. Bus controller 120 includes arbiter 130, feedback logic circuit 131 and PowerPC 4XX Local Bus 132. Bus controller 122 includes arbiter 134, feedback logic circuit 135 and on-chip peripheral bus 136.

4XX PPC CPU 102, DMA controller 104 and PLB master 106 are examples of "master" devices, and may be referred to as "Master 1," "Master 2," and "Master 3," respectively. EBIU 108 and OPB bridge 110 are examples of "slave" devices.

According to the present invention, Master 1 102, Master 2 104, and Master 3 106 are each operationally connectable to bus controller 120. In addition, slave 108 and slave 110 are also operationally connectable to bus controller 120. In the computer system illustrated generally at 100, slave 110 (i.e., OPB bridge), acts as a slave device and operationally connects one of Master 1 102, Master 2 104, and Master 3 106 to bus controller 122.

As illustrated in FIG. 1, the present invention may facilitate the interconnection of a plurality of master devices or functions to a commonly shared bus. Similarly, the present invention may also enable the interconnection of a plurality of slave devices to a commonly shared bus. Preferably, the master functions and the slave functions are contained within a single integrated chip. However, it will be understood as illustrated in FIG. 1, that the present invention may be used to connect devices located on a single chip such as computer system 100 to devices located on another chip via external bus 140.

Now referring to FIG. 2, the operation of the dynamic controlling system, including bus controller 120 will be described. Each master device has a latency timer. For example, Master 1 102 has latency timer 102a, Master 2 104 has latency timer 104a, and Master 3 106 has latency timer 106a.

In one embodiment of the present invention, the bus arbitration scheme implemented by bus controller 120 uses a dynamic priority scheme. Under this scheme, each master has an associated priority level. In the particular priority scheme, the priority level may be one of four levels represented by a two-bit request priority signal. The request priority levels are, in order from highest priority to lowest priority, as follows: "11" representing a priority level of "high", "10" representing a priority level of "medium high", "001" representing a priority level of "medium low", and "00" representing a priority level of "low". It will be understood by those having skill in the art that a variety of different priority schemes may be used.

In operation, a master submits a bus request and a corresponding request priority to the bus controller 120. For example, Master 1 102, when submitting a bus request, will simultaneously submit a bus request signal 202 and a request priority signal 204 to bus controller 120.

If bus controller 120 receives bus requests simultaneously from more than one master, arbiter 130 determines if bus 132 is available, compares all of the request priority levels and grants control of bus 132 to the master having the highest priority level. Once the arbiter 130 has granted control of bus 132 to the master which submitted the highest request priority in conjunction with its bus request, feedback logic circuit 131 then determines the level of the highest request priority among those devices having bus requests which are still pending. The resulting current pending request priority, together with the fact that another request is pending, is then fed back to each master across links 151 and 152, respectively. This information is then used by the master which currently has control of the bus to determine whether or not to terminate its control of the bus before it has completed its data transfer in order to let another master use the bus. In other words, the master currently having control of the bus may continue using the bus until all data which it currently needs to transfer has been transferred by dynamically changing its latency timer (i.e., overriding its expired latency timer) depending on the currently pending request priority.

Figure 2:
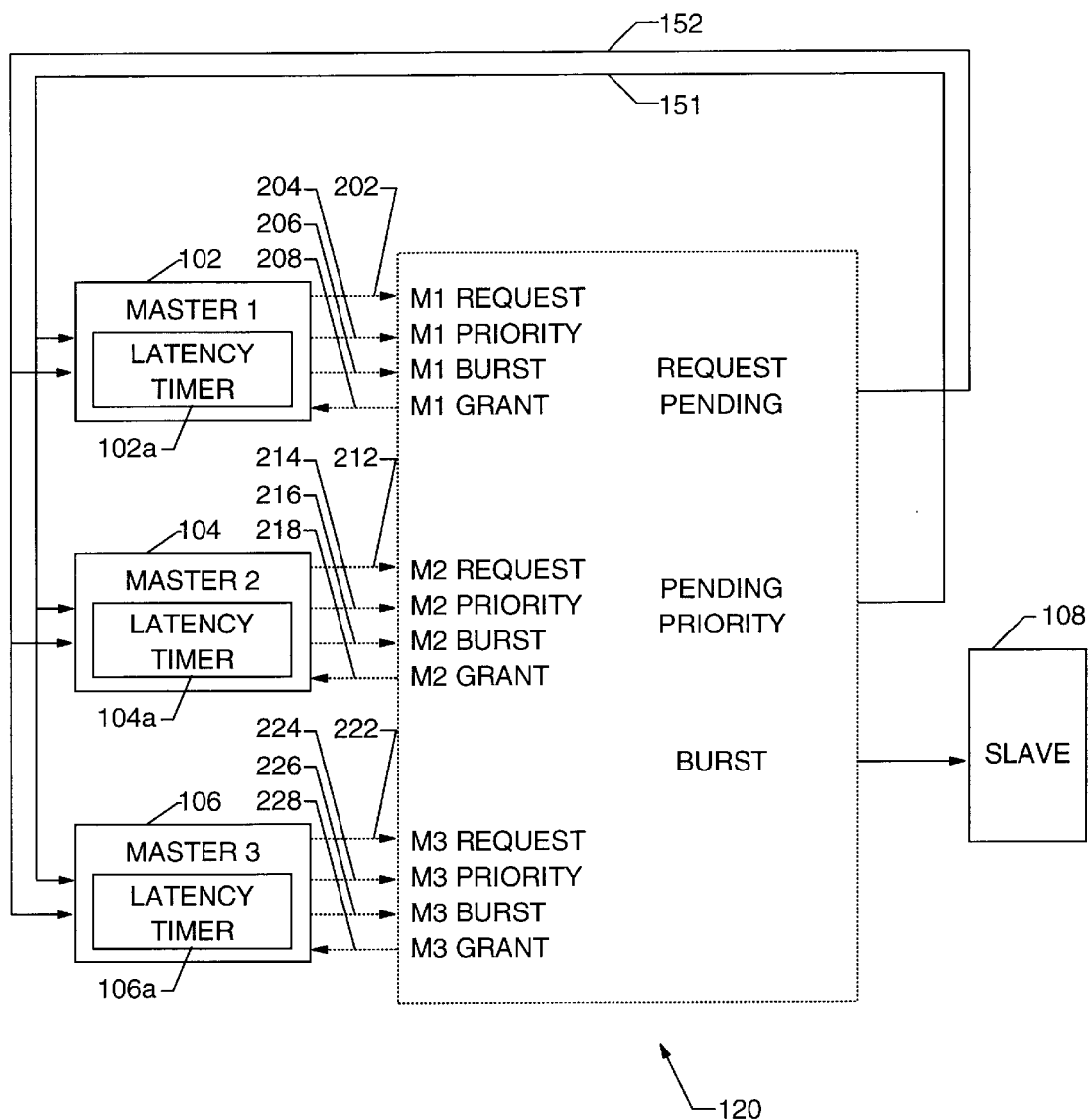
FIG. 2 is a block diagram illustrating the relationship between the master devices, bus controller, and a slave device according to the present invention.

Referring to FIG. 2, Master 1 102 submits its bus request 202 and request priority 204 to bus controller 120. Similarly, Master 2 submits its bus request 212 and request priority 214 to bus controller 120. Finally, Master 3 106 submits its bus request 222 and request priority 224 to bus controller 120. Once bus controller 120 receives one or more bus requests and corresponding request priorities, arbiter 130, which is a component of bus controller 120, identifies the master which submitted a bus request with the highest request priority, and grants bus 132 to the corresponding master. The master which was granted the bus receives a grant signal, turns off its request signal, and begins sending a burst transfer. By way of example, assuming arbiter 130 determined that Master 1 102 had the highest priority, arbiter 130 sends a grant 208 to Master 1 102, Master 1 102 receives the grant 208, turns off its request 202 and begins sending "burst" data 206 to bus controller 120 which, via bus 132, sends the burst to slave device 108. Similarly, if Master 2 104 had the highest priority, it receives the grant 218, turns off its request 212, and begins sending "burst" data 216. Finally, if Master 3 106 had the highest priority, it receives the grant 228, turns off its request 222 and begins sending "burst" data 226.

Feedback logic circuit 131 processes the remaining bus requests during each clock cycle. In particular, feedback logic circuit 131 compares the bus requests signals to determine if any requests are still pending. In addition, feedback logic circuit 131 also compares the request priority levels for each pending request to identify the highest pending request priority among the currently pending requests. Circuit 131 then transmits the value of the highest current pending request priority and the fact that a request is pending back to each master device on links 151 and 152, respectively, during each clock cycle. It will be understood by those skilled in the art that the pending request priority signal and pending request signal may be fed back to the master devices separately or as one combined signal.

Figure 3:
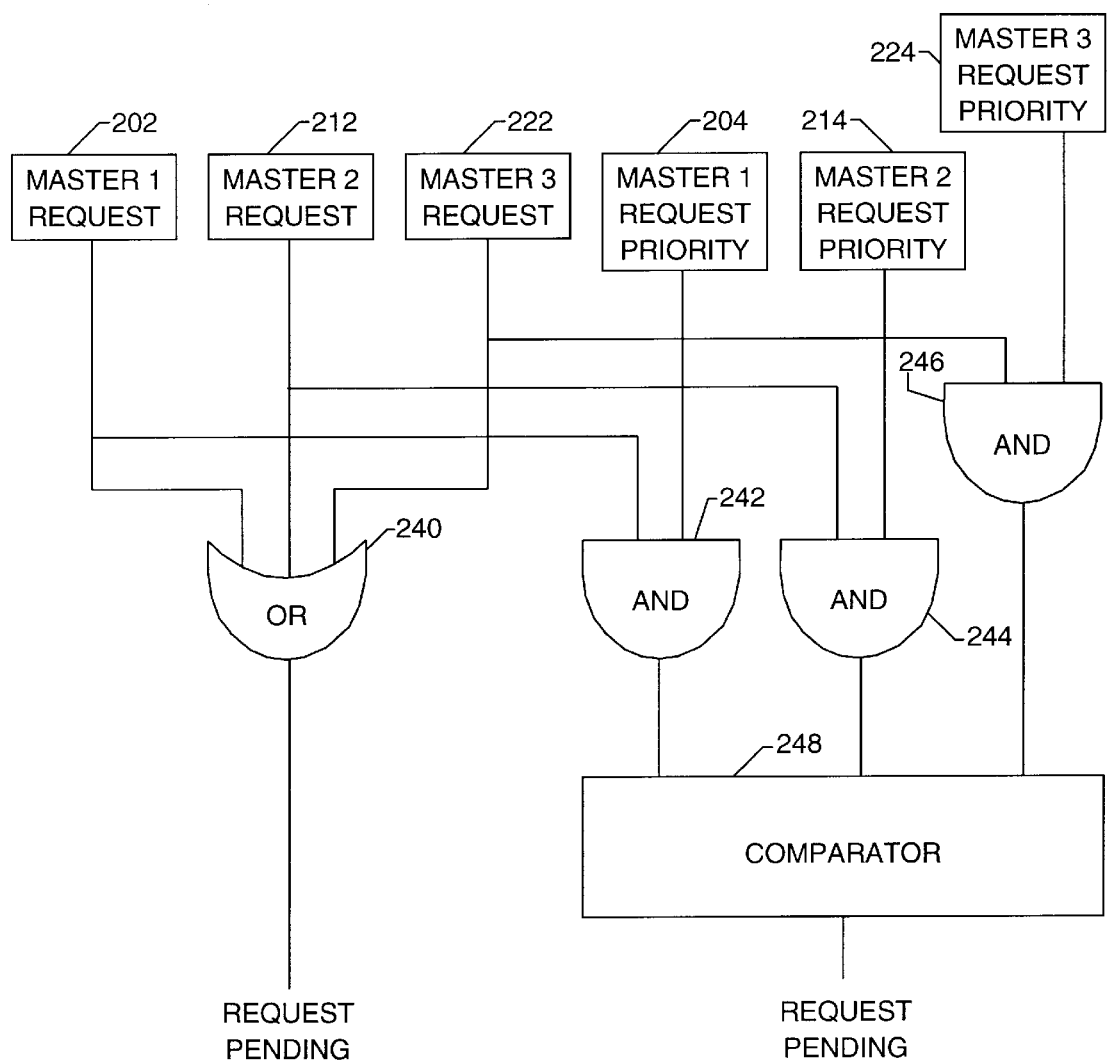
FIG. 3 is a block diagram illustrating the feedback logic circuit of the bus controller illustrated in FIG. 2.

Referring to FIG. 3, a preferred embodiment of feedback logic circuit 131 is illustrated. As illustrated in FIG. 3, the bus requests of the masters, namely, Master 1 request 202, Master 2 request 212, and Master 3 request 222 are compared by feedback logic circuit 131 using a logic "OR" gate 240. If any of the masters currently have a bus request pending, the output of OR gate 240 will be high or a logic "1". The output of logic "OR" gate 240 represents the request pending signal which is fed back by link 152 to each master.

In addition, the bus request signals from each of the masters are also combined with their corresponding request priority level using "AND" gate logic. Although only a single communications line (e.g. the communications line between Master 1 request priority 204 and "AND" gate 242) is shown, it will be understood by those skilled in the art that this one line represents collectively the total input lines for the request priority signal to the "AND" gate 242. In one particular embodiment, Master 1 bus request 202 is combined with its corresponding Master 1 request priority 204 using logic "AND" gate 242. Master 2 request 212 and Master 2 request priority 214 are combined using logic "AND" gate 244. Finally, Master 3 request 222 and Master 3 request priority 224 are combined using logic "AND" gate 246. The results of the comparisons of logic "AND" gates 242, 244 and 246 are compared using comparator 248. The result of comparator 248 represents the pending request priority signal which indicates the highest priority level among all currently pending bus requests. The pending request priority signal is fed back to each master across link 151.

Figure 4:
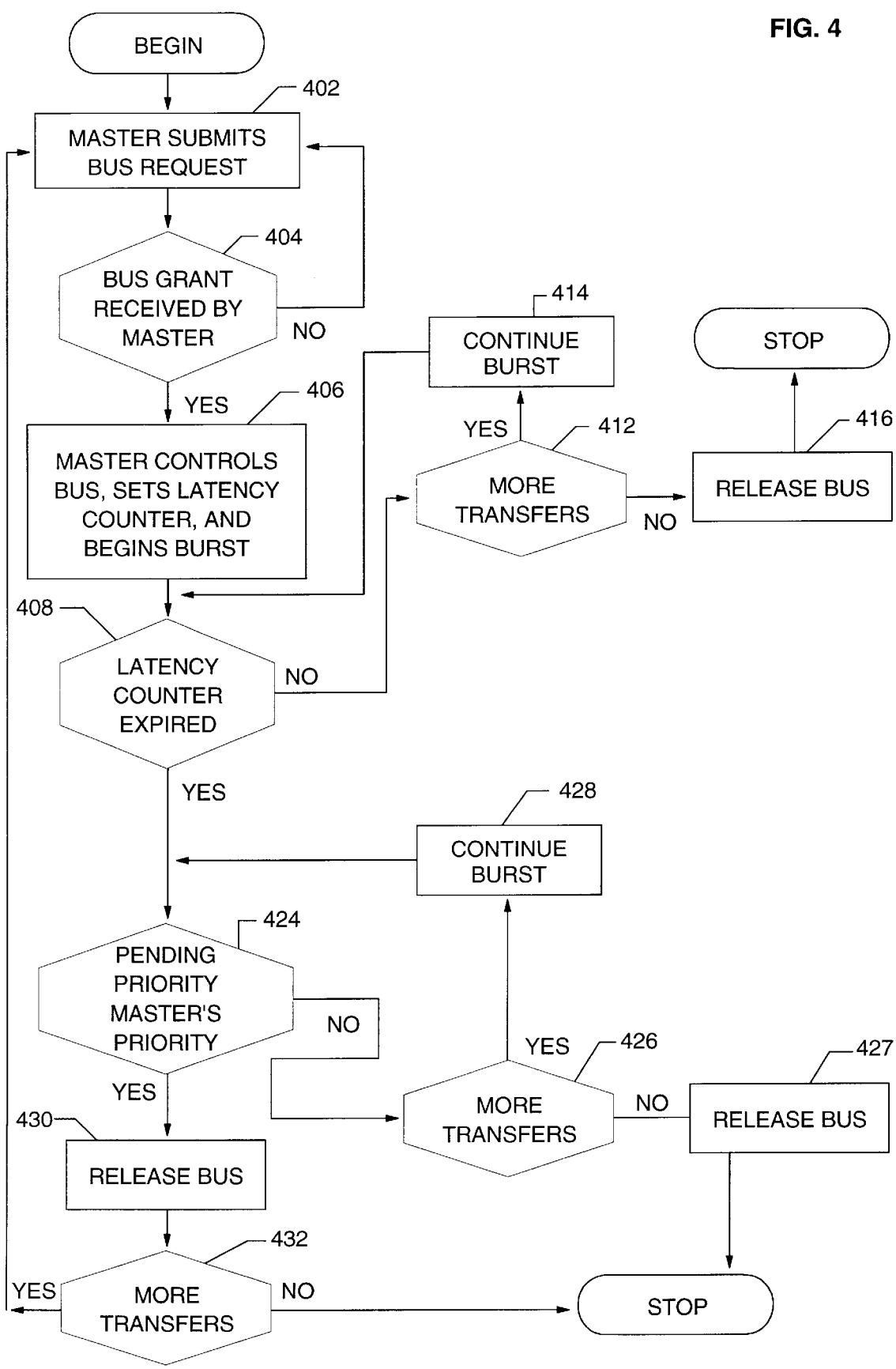
FIG. 4 is a flow chart representation illustrating the operation of the dynamically controlling system according to the present invention.

FIG. 4 is a flow chart and FIG. 5 is a timing diagram illustrating the methods, systems, and program products according to the present invention. It will be understood that each block or step of the timing diagram and flow chart, and combinations of the blocks or steps in the diagram and flow chart, can be implemented by computer program instructions. These computer program instructions may be loaded onto a computer or other programmable data processing apparatus to produce a machine such that the instructions which execute on the computer or other programmable apparatus create means for implementing the functions specified in the timing diagram or flow chart block(s) or step(s). These computer program instructions may also be stored in a computer readable memory that can direct a computer or other programmable apparatus to function in a particular manner, such that the instructions stored in the computer readable memory produce an article of manufacture including instruction means which implement the functions specified in the timing diagram or flow chart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the timing diagram or flow chart block(s) or step(s).

Accordingly blocks or steps of the timing diagram or flow chart illustrations support combinations of means for performing the specified functions, combinations of steps for performing the specified functions and program instruction means for performing the specified function. It will also be understood that each block or step of the timing diagram or flow chart illustrations, and combinations of blocks or steps in the timing diagram or flow chart illustrations, can be implemented by special purpose hardware based computer systems which perform the specified functions or steps, or combinations of special purpose hardware and computer instructions.

Referring to FIG. 4, a flow chart of the operations of the dynamic controlling system according to the present invention is illustrated. The operations illustrated in the flow chart of FIG. 4 are viewed from the context of a master device. The system begins when a master makes a bus request at 402. The master then begins checking at 404 during each clock cycle to determine if it has received a bus grant from the arbiter. If no grant is received, the master continues to request the bus and check its grant signal during each clock cycle. If a grant signal is received by the master at 404, the master takes control of the bus, sets its latency counter to "0", and may start a burst transfer at 406.

Thereafter, during each cycle, the master checks to see if its latency counter has expired at 408. If its latency counter has not expired, the master then determines if it still needs to control the bus (e.g., if it has more transfers to send across the bus) at 412. If the master has more transfers to send across the bus, the master then continues its burst at 414 and repeats the operations of decision blocks 408, 410 and 412 during each cycle. If the master determines at 412 that it no longer needs the bus (e.g., it has no more transfers to make across the bus), the master releases the bus at 416 which completes the data transfer.

If the master determines at 408 that its latency counter has expired, it then determines at 424 as to whether the pending request priority is greater than its own priority. If the pending request priority is greater than the master's priority, the master releases the bus at 430. If the pending request priority is not greater than its own priority, the master then determines whether it has more transfers to make at 426. If it has more transfers to make (or needs to continue controlling the bus), the master continues the burst during the present cycle at 428 and returns to 424 to continue the comparison process of the pending request priority versus its own priority during the next cycle. If the master determines at 426 that it no longer needs the bus, the master then releases the bus at 427 and stops.

Once the master releases the bus at 430, it determines at 432 whether it has more transfers to be made (i.e., it needs control of the bus again). If the master determines at 432 that it does not need to control the bus for additional cycles, it stops processing until it submits a new bus request to the bus controller. On the other hand, if the master determines at 432 that it needs control of the bus again for additional cycles, the master then submits another request to the bus controller at 402. The processing then continues as described above.

Referring to FIG. 5, a timing diagram illustrating an example of the operation of the present invention is shown. In the particular example illustrated in FIG. 5, arbiter 130 receives a bus request from Master 1 during Cycle 1 having a request priority of "10." Since no other requests are pending, arbiter 130 sends a grant signal back to Master 1 during Cycle 2. In response to receiving a grant signal, Master 1 turns off its request, resets its latency counter and begins controlling the bus during Cycle 2. In the example illustrated in FIG. 5, Master 1 immediately begins sending a burst across the bus during Cycle 2. Also during Cycle 2, feedback logic circuit 131 (see FIG. 2) determines that no other request is pending and feeds a "0" back to each master.

During Cycle 3, Master 2 submits a bus request having a request priority of "10." Feedback logic circuit 131 determines that Master 2's bus request is pending, and that it has a request priority of "10." As a result, feedback logic circuit 131 sends signals back to each master during Cycle 3 indicating that a request is pending and that the pending request priority is "10." During Cycle 3, Master 1 receives the pending request priority signal and the request pending signal from feedback logic circuit 131. In response, Master 1 compares the pending request priority of "10" against its own priority of "10," checks its latency timer to see if it has expired, and determines that it can continue to control the bus. As such, Master 1 continues to control the bus during Cycle 3.

Bus controller 120 receives a bus request from Master 3 during Cycle 4. This bus request has a priority level of "01." In response, feedback logic circuit 131 determines that bus requests are currently pending and also compares the request priority levels and determines that the highest pending request priority is "10." As a result, feedback logic circuit 131 sets the request pending signal to "1" and also sets the pending priority signal to "10" corresponding to the highest pending request priority level, and transmits these signals back to each master.

In response to the receipt of the request pending signal and the pending request priority, Master 1 compares the pending request priority to its own priority level during Cycle 4. Master 1 determines that its own priority is at least as great as the pending request priority during Cycle 4. However, also during Cycle 4, Master 1 determines that its latency timer has expired. Nonetheless, since its priority is at least as great as that of the pending request priority, Master 1 dynamically changes its latency timer by overriding it, and continues to control the bus and continues its "burst." This process continues during Cycles 5 and 6.

During Cycle 7, Master 3 decides to submit a different bus request having a request priority of "11." In response, feedback logic circuit 131 determines that a request is pending, and that the highest request pending priority level is "11." As a result, feedback logic circuit 131 sends a request pending signal and a request pending priority level of "11" back to each master during Cycle 7.

Master 1 receives the request pending signal and the request pending priority level of "11" during Cycle 7 from feedback logic circuit 131. In response, Master 1 compares the request pending priority level of "11" to its own priority level of "10" and determines that the request pending priority level is greater. As a result, Master 1 stops its burst and relinquishes control of the bus control during Cycle 7.

During Cycle 8, arbiter 130 determines that the bus is available, and based on a comparison of the priority levels of the pending requests for Master 2 and Master 3, determines that Master 3 has the highest pending request priority, and grants the bus to Master 3 during Cycle 8. As a result, Master 3 begins controlling the bus during Cycle 8 and initiates a burst on the bus. Feedback logic circuit continues processing as described above during Cycles 9 and 10. Based on Master 3's priority and latency timer, Master 3 continues its "burst" across the bus until it finishes its burst during Cycle 10. Master 3 then relinquishes the bus during Cycle 10 upon completion of its burst.

Finally, arbiter 130 determines that the bus is available during Cycle 11. As a result, arbiter 130 determines that Master 2's bus request is still pending and that it has the greatest pending request priority. Arbiter 130 grants the bus to Master 2 during Cycle 11, and, in response, Master 2 begins controlling the bus during Cycle 11 and begins a burst across the bus.

While the present invention has been described with respect to the transfer of application data on a bus, it will be understood that the present invention is not restricted to the transfer of any specific type of data or signals, but may apply also to the transfer of any other type of data such as instruction data, address data, data bus and transfer qualifiers, burst signals, bus lock signals, and so forth. Also, while the present invention has been described with respect to devices with predefined slave and master status, as will be appreciated by those of skill in the art, any particular device may be a slave device for one operation and a master device for a different operation.

In addition, the invention is also described with respect to "burst" transfers; however, the invention is not restricted to burst transfers but may also apply to bus locking mechanisms and other uses relating to bus control which may affect bus performance.

Furthermore, the present invention has been described with respect to positive logic such that a positive voltage corresponds to a logic state of "1." As will be appreciated by those of skill in the art, the present invention may also be implemented utilizing any suitable means of signifying an active and inactive state.

With respect to the arbiter function described above, it will be understood by those skilled in the art that the arbiter 130 may utilize any number of known methods of selecting competing priority levels. Implementation of arbiter 130, therefore, may be dependent upon the desired arbitration scheme.

In the drawings and specification, there have been disclosed typical preferred embodiments of the invention and, although specific terms are employed, they are used in a generic and descriptive sense only and are not for purposes of limitation, the scope of the invention being set forth in the following claims.

That which is claimed is:

1. A method for dynamically controlling a bus having a plurality of devices operationally connectable thereto, each of said devices having a priority level associated therewith, said method comprising the step of:

controlling the duration of control of the bus by a first of said devices based on the combination of a latency timer and the priority level associated with the first device, and a priority level associated with a pending request by a second of said devices to control the bus.

2. The method according to claim 1 wherein said controlling step comprises the steps of:

granting a request from a first of said devices to control the bus;

receiving a request to control the bus and a priority level associated with the request from a second of said devices;

transmitting the priority level associated with the request received from the second device and an associated pending request signal to the first device in response to the receipt of the request from the second device;

controlling the duration of the control of the bus by the first device based on a combination of a latency timer associated with the first device and a comparison of the priority level of the first device with the priority level associated with the request from the second device.

3. The method according to claim 1 wherein said controlling step comprises the steps of:

continuing control of the bus by the first device in response to the latency timer associated with the first device having not expired;

extending the duration of control of the bus by the first device in response to the priority level associated with the first device being at least as great as the priority level associated with the second device and the latency timer associated with the first device having expired; and terminating the control of the bus by the first device in response to the priority level associated with the first device being less than the priority level associated with the second device and the latency timer associated with the first device having expired.

4. The method according to claim 1 wherein said controlling step is preceded by the steps of:

receiving at least one request to control the bus and a priority level associated with the request from the plurality of devices;

arbitrating the priority levels associated with the requests received from the devices to identify a first priority level having the greatest value among the received priority levels and for identifying the device associated with the identified first priority level as a first device; and granting control of the bus to the first device in response to the arbitrating step.

5. The method according to claim 1 further comprising the step of:

transferring data between the first device and said bus in response to said controlling step.

6. The method according to claim 5 wherein said data comprises at least one of applications data, computer program instructions, and address data.

7. A method for dynamically controlling access to a bus having a plurality of devices operationally connectable thereto, each of said devices having a priority level associated therewith, said method comprising the steps of:

receiving at least one request to control the bus and a priority level associated with the request from the plurality of devices;

arbitrating the priority levels associated with the requests received from the devices to identify a first priority level having the greatest value among the received priority levels and for identifying the device associated with the identified first priority level as a first device;

granting control of the bus to the first device in response to the arbitrating step;

receiving a request to control the bus and a priority level associated with the request from a second of said devices; and transmitting the priority level associated with the request received from the second device and an associated pending request signal to the first device having control of access to the bus in response to the receipt of the request from the second device.

8. The method according to claim 7 wherein the transmitting step is preceded by the step of:

comparing the priority level associated with the second device with the priority levels associated with each device other than the first device to identify the priority level having the highest level; and substituting the identified priority level for the second priority level.

9. The method according to claim 7 further comprising the step of:

transferring data between the bus and the first device.

10. The method according to claim 9 wherein said data comprises at least one of applications data, computer program instructions, and address data.

11. A method for dynamically accessing a bus having a plurality of devices operationally connectable thereto, each of said devices having a priority level associated therewith, said method comprising the step of:

controlling the duration of access to the bus by a first of said devices based on the combination of a latency timer and the priority level associated with the first device, and a priority level associated with a pending request by a second of said devices to control the bus.

12. The method according to claim 11 wherein said controlling step comprises the steps of:

receiving control of the bus by a first device from a bus controller in response to a request by the first device and a priority level associated therewith; and receiving a second priority level from the bus controller, said second priority level associated with a pending control request received by the bus controller from a second device.

13. The method according to claim 12 wherein said controlling step further comprises the step of:

controlling the duration of the control of the bus by the first device based on a combination of a latency timer associated with the first device and a comparison of the priority level of the first device with the second priority level associated with the request from the second device.

14. The method according to claim 12 wherein said receiving control of the bus by a first device step is preceded by the steps of:

requesting control of the bus by the first device of the plurality of devices from the bus controller wherein the request by the first device has a priority level associated therewith.

15. The method according to claim 11 wherein said controlling step comprises the steps of:

continuing control of the bus by the first device in response to the latency timer associated with the first device having not expired;

extending the duration of control of the bus by the first device in response to the priority level associated with the first device being at least as great as the priority level associated with the second device and the latency timer associated with the first device having expired; and terminating the control of the bus by the first device in response to the priority level associated with the first device being less than the priority level associated with the second device and the latency timer associated with the first device having expired.

16. The method according to claim 11 further comprising the step of:

transferring data between the first device and said bus in response to said controlling step.

17. The method according to claim 16 wherein said data comprises at least one of applications data, computer program instructions, and address data.

18. A system for dynamically controlling a bus, said system comprising:

a plurality of devices, each of said devices having a priority level and a latency timer associated therewith; and a bus controller, operationally connectable to each of said devices, for controlling the duration of control of a bus by a first of said devices based on the combination of the latency timer and the priority level associated with the first device, and a priority level associated with a pending request by a second of said devices to control the bus.

19. The system according to claim 18 wherein said bus controller comprises:

means for granting a request from a first of said devices to control the bus;

means for receiving a request to control the bus and a priority level associated with the request from a second of said devices;

feedback means for transmitting the priority level associated with the request received from the second device and the first device in response to the receipt of the request from the second device; and means for controlling the duration of the control of the bus by the first device based on a combination of the latency timer associated with the first device and a comparison of the priority level of the first device with the priority level associated with the request from the second device.

20. The system according to claim 19 wherein said bus controller comprises:

continuing controlling means for continuing control of the bus by the first device in response to the latency timer associated with the first device having not expired;

extension means for extending the duration of control of the bus by the first device in response to the priority level associated with the first device being at least as great as the priority level associated with the second device and the latency timer associated with the first device having expired; and terminating means for terminating control of the bus by the first device in response to the priority level associated with the first device being less than the priority level associated with the second device and the latency timer associated with the first device having expired.

21. The system according to claim 18 further comprising:

second receiving means for receiving at least one request to control the bus and a priority level associated with the request from the plurality of devices;

arbitrating means for comparing the priority levels associated with the requests received from the devices to identify a first priority level having the greatest value among the received priority levels and for identifying the device associated with the identified first priority level as a first device; and granting means for granting control of the bus to the first device in response to the arbitrating means.

22. The system according to claim 18 further comprising:

means for transferring data between the first device and said bus in response to said bus controller.

23. The system according to claim 22 wherein said data comprises at least one of applications data, computer program instructions, and address data.

24. A system for dynamically controlling access to a bus having a plurality of devices operationally connectable thereto, each of said devices having a priority level associated therewith, said system comprising:

means for receiving a request to control the bus and a priority level associated with the request from a second of said devices; and feedback means for transmitting the priority level associated with the request received from the second device to a first of said devices having control of access to the bus in response to the receipt of the request from the second device.

25. The system according to claim 24 wherein said feedback means comprises:

determining means for comparing the priority level associated with each device other than the first device from which a control request is received to identify the priority level having the greatest value; and transmitting means for transmitting the identified priority level and a pending request signal to the first device.

26. The system according to claim 24 further comprising:

means for transferring data between the bus and the first device.

27. The system according to claim 26 wherein said data comprises at least one of applications data, computer program instructions, and address data.

28. A system for dynamically accessing a bus, said system comprising:

a plurality of devices, each of said devices being operationally connectable to the bus and having a priority level associated therewith; and duration means for controlling the duration of access to the bus by a first of said devices based on the combination of a latency timer and the priority level associated with the first device, and a priority level associated with a pending request by a second of said devices to control the bus.

29. The system according to claim 28 wherein said duration means comprises:

means for receiving control of the bus by a first device from a bus controller in response to a request by the first device and a priority level associated therewith; and means for receiving a second priority level from the bus controller, said second priority level associated with a pending control request received by the bus controller from a second device.

30. The system according to claim 29 wherein said duration means further comprises:

means for controlling the duration of the control of the bus by the first device based on a combination of a latency timer associated with the first device and a comparison of the priority level of the first device with the second priority level associated with the request from the second device.

31. The system according to claim 30 wherein said system further comprises:

means for requesting control of the bus by the first device of the plurality of devices from the bus controller wherein the request by the first device has a priority level associated therewith.

32. The system according to claim 28 wherein said duration means comprises:

continuing controlling means for continuing control of the bus by the first device in response to the latency timer associated with the first device having not expired;

extension means for extending the duration of control of the bus by the first device in response to the priority level associated with the first device being at least as great as the priority level associated with the second device and the latency timer associated with the first device having expired; and terminating means for terminating the control of the bus by the first device in response to the priority level associated with the first device being less than the priority level associated with the second device and the latency timer associated with the first device having expired.

33. The system according to claim 28 further comprising:

means for transferring data between the first device and said bus in response to said duration means.

34. The system according to claim 33 wherein said data comprises at least one of applications data, computer program instructions, and address data.

35. A computer program product for dynamically controlling a bus having a plurality of devices operationally connectable thereto, each of said devices having a priority level associated therewith, said computer program product comprising:

a computer readable storage medium having computer readable code means embodied in said medium, said computer readable code means comprising:

computer instruction means for controlling the duration of control of the bus by a first of said devices based on the combination of a latency timer and the priority level associated with the first device, and a priority level associated with a pending request by a second of said devices to control the bus.

36. A computer program product according to claim 35 wherein said computer instruction means for controlling comprises:

computer instruction means for granting a request from a first of said devices to control the bus;

computer instruction means for receiving a request to control the bus and a priority level associated with the request from a second of said devices;

computer instruction means for transmitting the priority level associated with the request received from the second device to each of said devices in response to the receipt of the request from the second device;

computer instruction means for controlling the duration of the control of the bus by the first device based on a combination of a latency timer associated with the first device and a comparison of the priority level of the first device with the priority level associated with the request from the second device.

37. A computer program product according to claim 35 wherein said computer instruction means for controlling comprises:

computer instruction means for continuing control of the bus by the first device in response to the latency timer associated with the first device having not expired;

computer instruction means for extending the duration of control of the bus by the first device in response to the priority level associated with the first device being at least as great as the priority level associated with the second device and the latency timer associated with the first device having expired; and computer instruction means for terminating the control of the bus by the first device in response to the priority level associated with the first device being less than the priority level associated with the second device and the latency timer associated with the first device having expired.

38. A computer program product according to claim 35 wherein said computer readable code means further comprises:

computer instruction means for receiving at least one request to control the bus and a priority level associated with the request from the plurality of devices;

computer instruction means for arbitrating the priority levels associated with the requests received from the devices to identify a first priority level having the greatest value among the received priority levels and for identifying the device associated with the identified first priority level as a first device; and computer instruction means for granting control of the bus to the first device in response to the computer instruction means for arbitrating the priority levels.

39. A computer program product according to claim 35 wherein said computer readable code means further comprises:

computer instruction means for transferring data between the first device and said bus in response to said computer instruction means for controlling the duration.

40. A computer program product according to claim 39 wherein said data comprises at least one of applications data, computer program instructions, and address data.

41. A computer program product for dynamically controlling access to a bus having a plurality of devices operationally connectable thereto, each of said devices having a priority level associated therewith, said computer program product comprising:

a computer readable storage medium having computer readable code means embodied in said medium, said computer readable code means comprising:

computer instruction means for receiving at least one request to control the bus and a priority level associated with the request from the plurality of devices;

computer instruction means for arbitrating the priority levels associated with the requests received from the devices to identify a first priority level having the greatest value among the received priority levels and for identifying the device associated with the identified first priority level as a first device;

computer instruction means for granting control of the bus to the first device in response to the arbitrating step;

computer instruction means for receiving a request to control the bus and a priority level associated with the request from a second of said devices; and computer instruction means for transmitting the priority level associated with the request received from the second device and an associated pending request signal to the first device having control of access to the bus in response to the receipt of the request from the second device.

42. A computer program product according to claim 41 wherein said computer readable code means further comprises:

computer instruction means for transferring data between the bus and the first device.

43. A computer program product according to claim 42 wherein said data comprises at least one of applications data, computer program instructions, and address data.

44. A computer program product for dynamically accessing a bus having a plurality of devices operationally connectable thereto, each of said devices having a priority level associated therewith, said computer program product comprising:

a computer readable storage medium having computer readable code means embodied in said medium, said computer readable code means comprising:

computer instruction means for controlling the duration of access to the bus by a first of said devices based on the combination of a latency timer and the priority level associated with the first device, and a priority level associated with a pending request by a second of said devices to control the bus.

45. A computer program product according to claim 44 wherein said computer instruction means for controlling comprises:

computer instruction means for receiving control of the bus by a first device from a bus controller in response to a request by the first device and a priority level associated therewith; and computer instruction means for receiving a second priority level from the bus controller, said second priority level associated with a pending control request received by the bus controller from a second device.

46. A computer program product according to claim 45 wherein said computer instruction means for controlling further comprises:

computer instruction means for controlling the duration of the control of the bus by the first device based on a combination of a latency timer associated with the first device and a comparison of the priority level of the first device with the second priority level associated with the request from the second device.

47. A computer program product according to claim 45 wherein said computer readable code means further comprises:

computer instruction means for requesting control of the bus by the first device of the plurality of devices from the bus controller wherein the request by the first device has a priority level associated therewith.

48. A computer program product according to claim 44 wherein said computer instruction means for controlling comprises:

computer instruction means for continuing control of the bus by the first device in response to the latency timer associated with the first device having not expired;

computer instruction means for extending the duration of control of the bus by the first device in response to the priority level associated with the first device being at least as great as the priority level associated with the second device and the latency timer associated with the first device having expired; and computer instruction means for terminating the control of the bus by the first device in response to the priority level associated with the first device being less than the priority level associated with the second device and the latency timer associated with the first device having expired.

49. A computer program product according to claim 44 wherein said computer readable code means further comprises:

computer instruction means for transferring data between the first device and said bus in response to said computer instruction means for controlling the duration.

50. A computer program product according to claim 49 wherein said data comprises at least one of applications data, computer program instructions, and address data.

* * * * *